(12) United States Patent
Dake (10) Patent No.: US 8,386,855 B2
(45) Date of Patent: Feb. 26, 2013

(54) DISTRIBUTED HEALTHCHECKING MECHANISM

(75) Inventor: Steven C. Dake, Flagstaff, AZ (US)

(73) Assignee: Red Hat, Inc., Raleigh, NC (US)

( * ) Notice: Subject to any disclaimer, the term of this patent is extended or adjusted under 35 U.S.C. 154(b) by 276 days.

(21) Appl. No.: 12/787,314

(22) Filed: May 25, 2010

(65) Prior Publication Data

US 2011/0296231 A1    Dec. 1, 2011

(51) Int. Cl.
*G06F 11/14*    (2006.01)
*G06F 11/00*    (2006.01)
(52) U.S. Cl. .............................. 714/48; 714/4.1; 714/31
(58) Field of Classification Search ................... 714/4.1, 714/4.2, 4.3, 4.4, 25, 31, 48
See application file for complete search history.

(56) References Cited

U.S. PATENT DOCUMENTS

| 7,243,265 | B1* | 7/2007 | Wookey et al. | 714/48 |
| 8,161,323 | B2* | 4/2012 | Kuchibhotla et al. | 714/48 |
| 2009/0037573 | A1* | 2/2009 | Qiu et al. | 714/4 |
| 2009/0106571 | A1* | 4/2009 | Low et al. | 713/310 |
| 2009/0192818 | A1* | 7/2009 | Compton et al. | 705/2 |
| 2011/0153822 | A1* | 6/2011 | Rajan et al. | 709/225 |
| 2011/0283149 | A1* | 11/2011 | Richmond | 714/39 |

* cited by examiner

*Primary Examiner* — Joseph D Manoskey
(74) *Attorney, Agent, or Firm* — Lowenstein Sandler LLP (57) ABSTRACT

Some embodiments of a system and a method to perform distributed healthchecking in a cluster system have been presented. For instance, a distributed healthchecking manager executable on a centralized server in a cluster system can assign nodes of the cluster system to at least some of the nodes for healthchecking. Then the distributed healthchecking manager may monitor the nodes performing healthchecking for reports of one or more failed nodes.

17 Claims, 7 Drawing Sheets

DISTRIBUTED HEALTHCHECKING MECHANISM

TECHNICAL FIELD

Embodiments of the present invention relate to cluster systems, and more specifically to performing healthchecking on nodes in a cluster system.

BACKGROUND

Figure 1A:
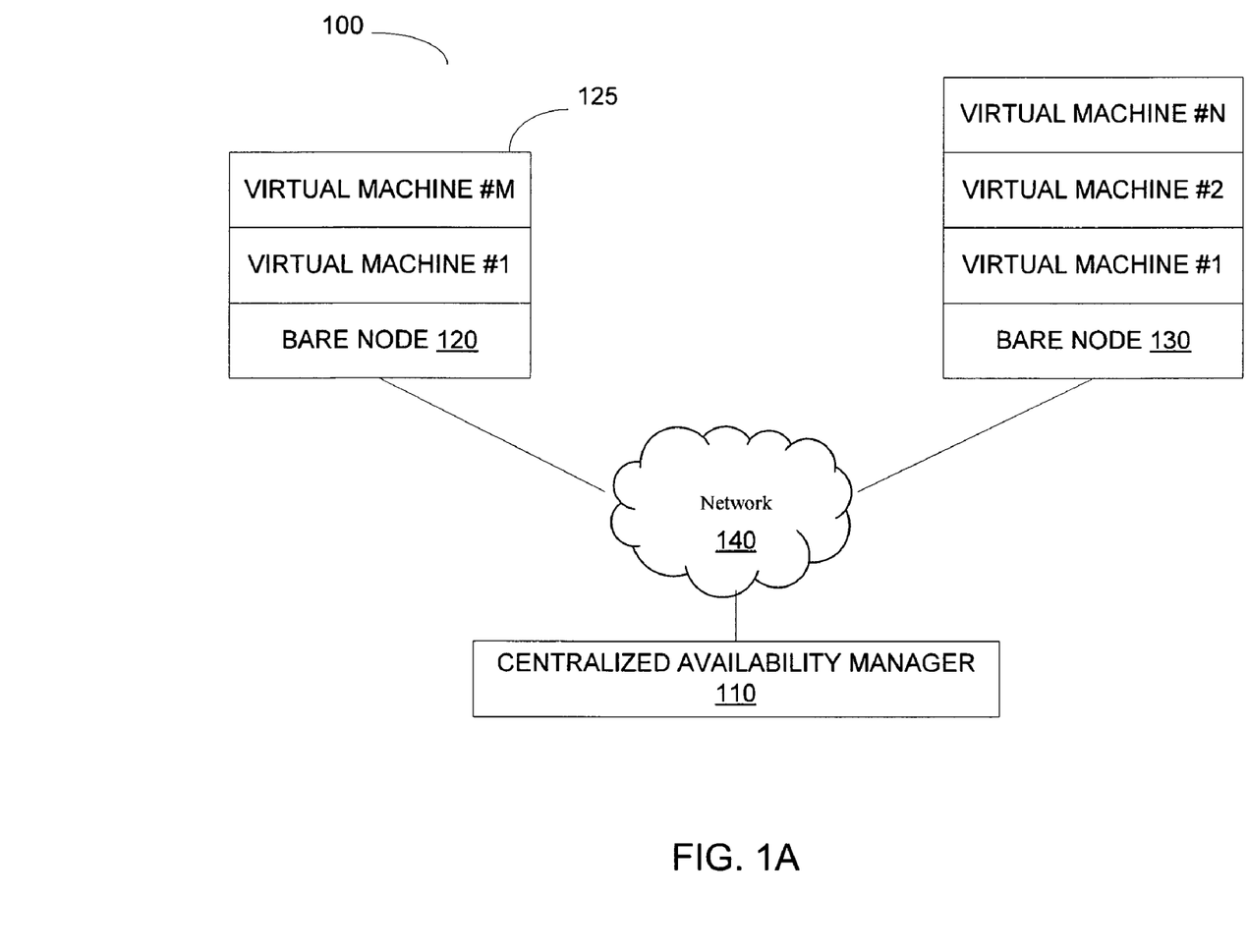
FIG. 1A illustrates a conventional cluster system.

Conventionally, a cluster system typically includes a centralized availability manager to monitor nodes in the cluster system to ensure that the nodes are operational. FIG. 1A illustrates one conventional cluster system adopting such a scheme. The system 100 includes a centralized availability manager 110 and two bare nodes 120 and 130, coupled to each other via a network 140. Each of the bare nodes 120 and 130 is implemented on a physical computing machine. Multiple virtual machines (e.g., virtual machines 125) are emulated on each of the bare nodes 120 and 130. Each virtual machine in the system 100 can be considered as a node as well.

Figure 1B:
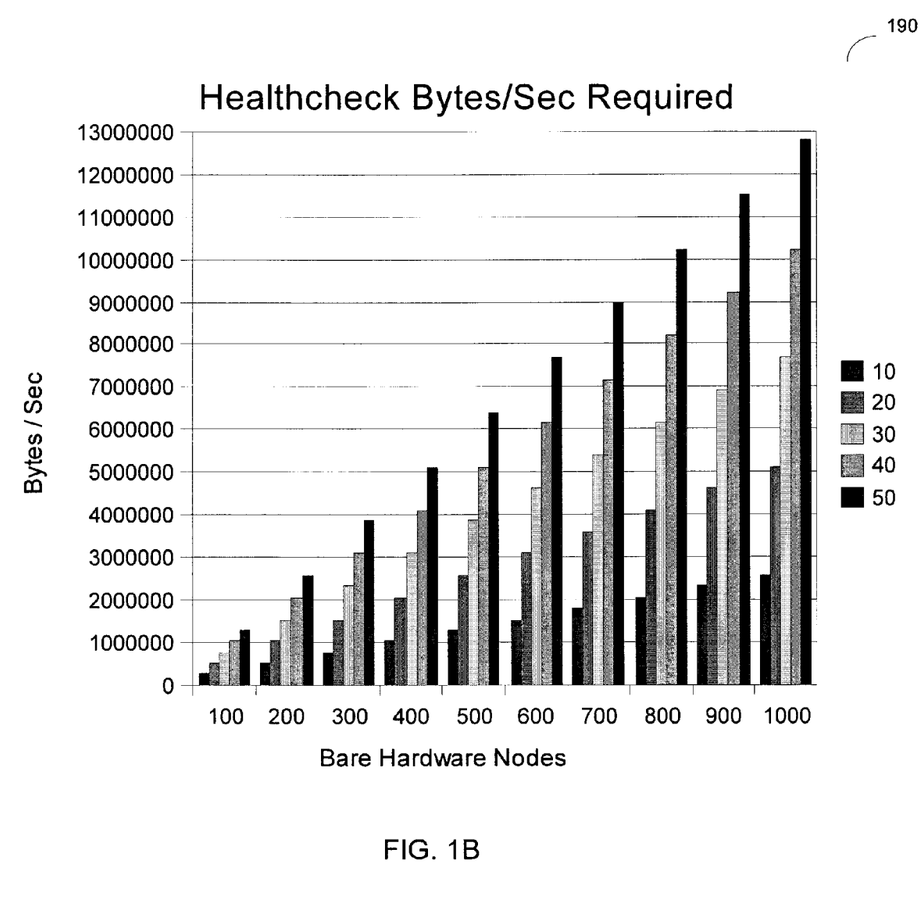
FIG. 1B shows bandwidth requirements of some conventional cluster systems of various sizes.

In the cluster system 100, the centralized availability manager 110 healthchecks each node (which may be a virtual machine or a bare node) to ensure that the software running on that virtual machine or bare node is operational and no software or hardware fault has occurred. With thousands of nodes in some conventional cluster systems, and hundreds of virtual machines per bare node, the centralized availability manager 110 can consume more bandwidth than is available, just for healthchecking operations. In one implementation, the healthchecking bandwidth requirements are given by the equation:

$$B=(N*M*D)/P,$$

where B is bandwidth required, N is the number of bare nodes, M is the number of virtual nodes, D is the amount of data transferred per healthcheck, and P is the periodicity of the healthcheck. Using the above equation, the bandwidth requirements for even small scale cluster systems, which include merely thousands of nodes, can be significant, as shown in the graph 190 illustrated in FIG. 1B.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a method, an apparatus, and a system to perform distributed healthchecking in a cluster system. In some embodiments, a distributed healthchecking manager executable on a centralized server in a cluster system can assign nodes of the cluster system to at least some of the nodes for healthchecking. Then the distributed healthchecking manager may monitor the nodes performing healthchecking for reports of one or more failed nodes. Thus, instead of healthchecking all nodes in the cluster system by itself, which consumes significant amount of bandwidth, the distributed healthchecking manager may only occasionally receives failure reports from some of the nodes under normal circumstances. Details of some embodiments of how to perform distributed healthchecking in a cluster system are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "collecting" or "monitoring" or "reporting" or "receiving" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including optical disks, CD-ROMs, and magnetic-optical disks, read-only memories (ROMs), random access memories (RAMs), EPROMs, EEPROMs, flash memories, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 2A:
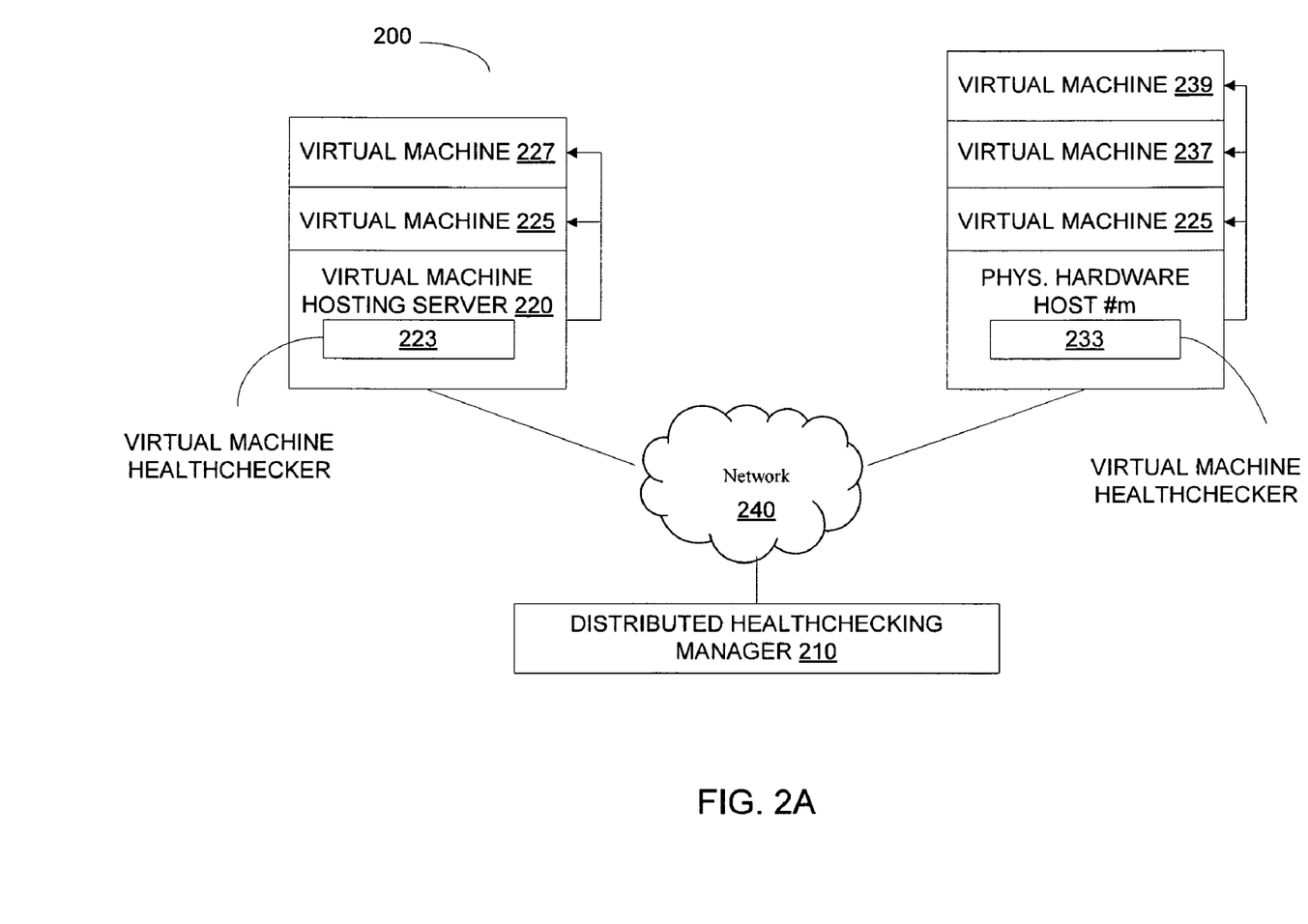
FIG. 2A illustrates one embodiment of a cluster system with a distributed healthchecking mechanism.
Figure 4:
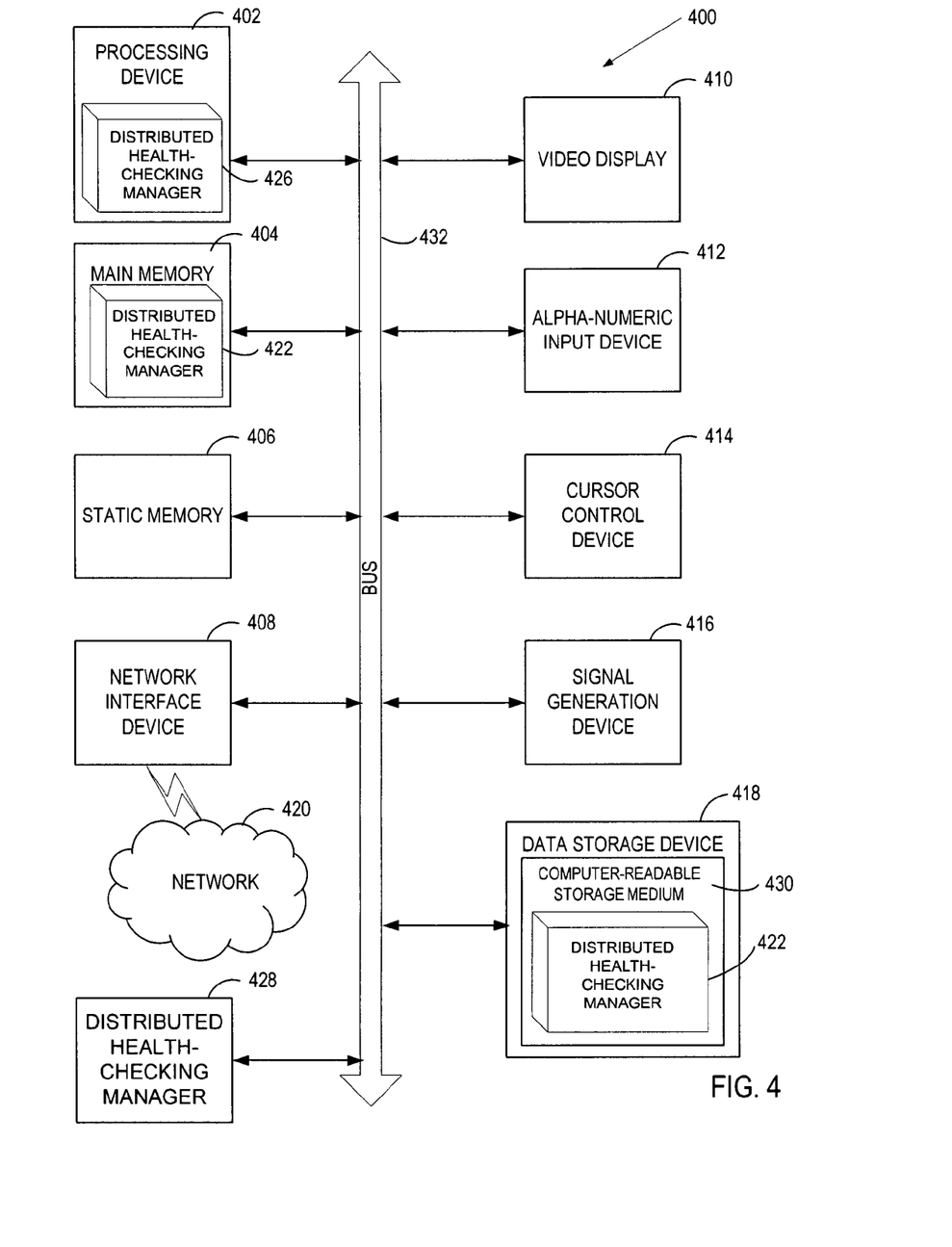
FIG. 4 illustrates a block diagram of an exemplary computing system.

FIG. 2A illustrates one embodiment of a cluster system with a distributed healthchecking mechanism according to one embodiment of the invention. The system 200 includes a distributed healthchecking manager 210, two virtual machine hosting servers 220 and 230, and a network 240. The distributed healthchecking manager 210 may be implemented on a physical computing machine, such as a server, a desktop personal computer, a laptop computer, etc. Likewise, the virtual machine hosting servers 220 and 230 are implemented on physical computing machines. Details of one example of a physical computing machine are illustrated in FIG. 4. The distributed healthchecking manager 210 is communicably coupled to the virtual machine hosting servers 220 and 230 via the network 240, which may include one or more of a public network (e.g., the Internet), a private network (e.g., a local area network), a wireless network, a wire-lined network, etc. Note that the system 200 may include additional virtual machine hosting servers and/or other devices in different embodiments.

Each of the virtual machine hosting servers 220 and 230 has a number of virtual machines emulated thereon. The number of virtual machines emulated on the virtual machine hosting servers 220 and 230 may vary. For example, virtual machines 225 and 227 are emulated on virtual machine hosting server 220, and virtual machines 235, 237 and 239 are emulated on virtual machine hosting server 230. Broadly speaking, virtualization is emulation of physical hardware. A virtual machine, thus, generally refers to a software implementation of a machine that executes programming instructions to perform operations and tasks as if executed by a physical machine, such as a personal computer. In some embodiments, virtual machine healthcheckers 223 and 233 are provided on the virtual machine hosting servers 220 and 230, respectively, which in turn checks the health of each virtual machine provisioned thereon. Healthchecking as used herein generally refers to monitoring a device (which may be physical or virtual) and detecting any abnormal event at the device or malfunctioning of the device. The virtual machine healthcheckers 223 and 233 may be implemented with software daemons executable on processing devices within the virtual machine hosting servers 220 and 230, respectively.

Figure 2B:
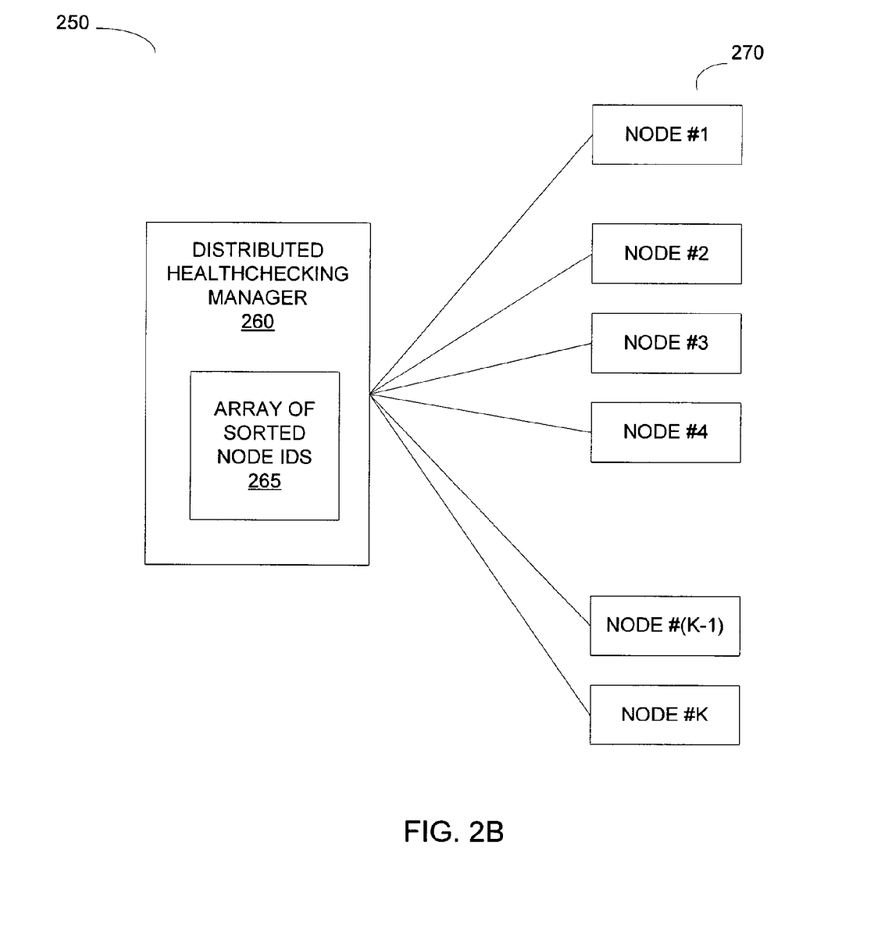
FIG. 2B illustrates an alternate embodiment of a cluster system with a distributed healthchecking mechanism.
Figure 2C:
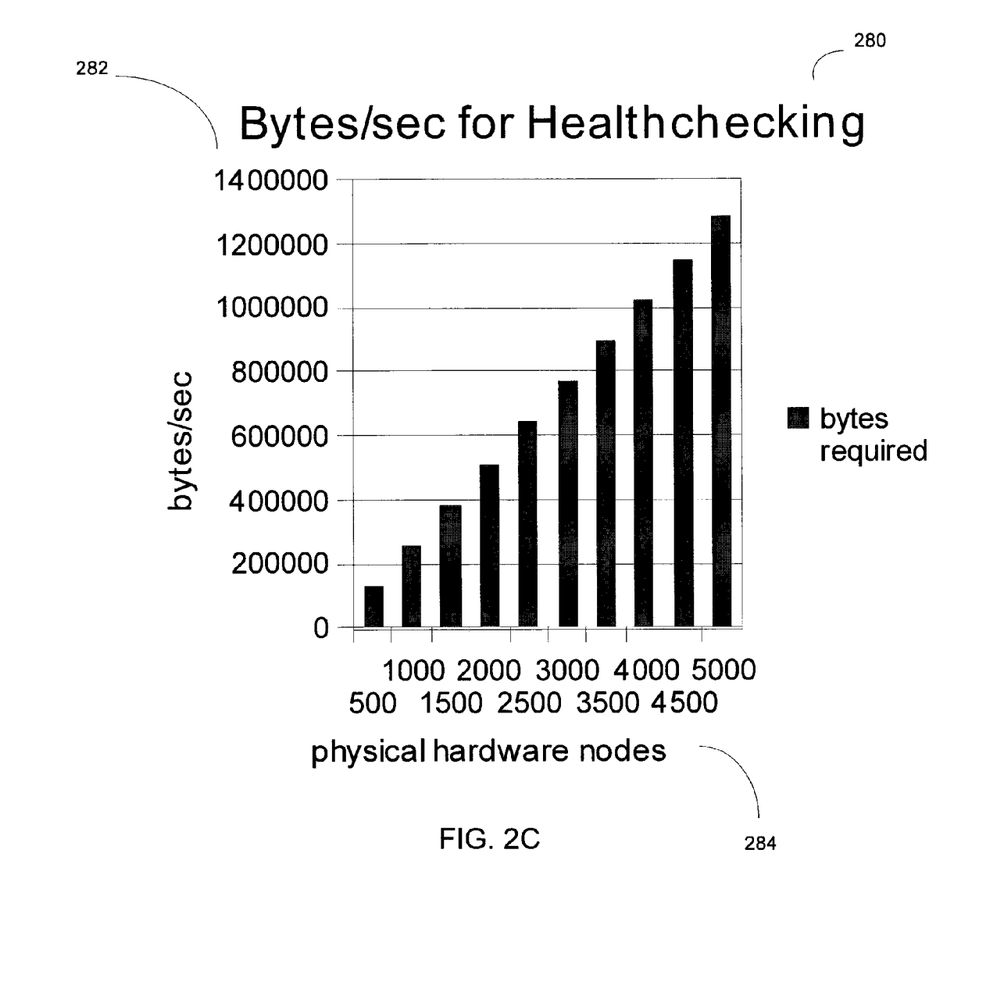
FIG. 2C shows the bandwidth requirements of some embodiments of cluster systems of different sizes according to one embodiment of the invention.

By distributing and offloading healthchecking of virtual machines (e.g., virtual machines 225 and 227) to their respective virtual machine hosting servers (e.g., server 220), the bandwidth requirement of the distributed healthchecking manager 210 becomes less than the bandwidth requirements of to some conventional centralized availability managers. In one implementation, the bandwidth requirement of the distributed healthchecking manager 210 can be computed by:

$$B=(N*D)/P,$$

where B is the bandwidth required, N is the number of nodes, D is the amount of data transferred per healthcheck, and P is the periodicity of the healthcheck. The bandwidths required 282 for healthchecking computed using the above formula versus systems having different numbers of nodes 284 are plotted in the graph 280 shown in FIG. 2C.

To further reduce the bandwidth required for healthchecking, healthchecking is made scalable in some cluster systems. In some embodiments, the task of healthchecking is made scalable by distributing to every node in a cluster system as illustrated in FIG. 2B. Referring to FIG. 2B, the cluster system 250 includes a distributed healthchecking manager 260 and a number of nodes 270. Each of the nodes 270 may be implemented on a physical computing machine or on a virtual machine emulated on a physical computing machine. Each of the nodes 270 may be assigned a distinct node identifier, which may include the Internet Protocol (IP) address of the respective node. The distributed healthchecking manager 260 may be implemented on a physical computing machine, such as a server, a desktop personal computer, a laptop computer, etc. The distributed healthchecking manager 260 may maintain an array of sorted node identifiers 265 stored in a computer-readable storage medium in the physical computing machine.

In some embodiments, when a virtual machine or a virtual machine hosting server starts in the system 250, it may register with the distributed healthchecking manager 260. The distributed healthchecking manager 260 assigns a predetermined number of nodes (e.g., two nodes) to the starting machine to healthcheck. The machine then healthchecks these nodes assigned by periodically sending a message to each of the nodes individually and waiting for a response. If a response is not received within a configurable time period, the machine responds to the distributed healthchecking manager 260 with a node failure event. Then the distributed healthchecking manager 260 takes corrective action and informs the machine that is monitoring the failed node to monitor a different set of nodes in the cluster system 250.

The distributed healthchecking manager 260 determines which nodes should monitor their peers. The distributed healthchecking manager 260 may do so by sorting the nodes by their node identifiers and storing the sorted node identifiers in the array 265. Consider the example in which every node in the system 250 healthchecks two (2) other nodes in the system 250. Upon being notified of a healthcheck failure, the distributed healthchecking manager 260 removes the failed node from the array 265 and reassigns every remaining node a new list of 2 nodes. The distributed healthchecking manager 260 is responsible for distributing this information to the remaining nodes. In the current example, the nodes include the node in the array 265 at position −1, and the node in position +1. In the case where the last node is being sent a notification, its "to the right" node is set to index 0 of the array 265. In the case where the first node being sent a notification is "to the left" node, it is set to the index at the end of the array 265. In the current example, node #1 monitors node #2 and node #k, node #2 monitors node #1 and node #3, node #3 monitors node #2 and node #4, and node #k monitors node #(k−1) and node #1, etc. Suppose node #1 detects that node #2 fails, and then reports the failure to the distributed healthchecking manager 260. The distributed healthchecking manager 260 removes node #2 from the array 265 and reassigns node #3 and node #k to node #1 to monitor. Likewise, the distributed healthchecking manager 260 may reassign node #1 and node #4 to node #3 to monitor. The distributed healthchecking manager 260 may take corrective action on the failed node #2, such as, for example, alerting an administrator of the cluster system 250 of the failed node #2.

In some embodiments, a process running on each node is responsible for receiving the node identifiers of the nodes to monitor from the distributed healthchecking manager 260, monitoring the nodes assigned, and sending failure notifications to the distributed healthchecking manager 260. Using this mechanism, the individual load of the distributed healthchecking manager 260 becomes very low during normal operation, and the load on each individual node can be computed by the following equation:

$$B=D/P,$$

where B is the bandwidth required, D is the amount of data transferred per healthcheck, and P is the periodicity of the healthcheck.

Figure 3A:
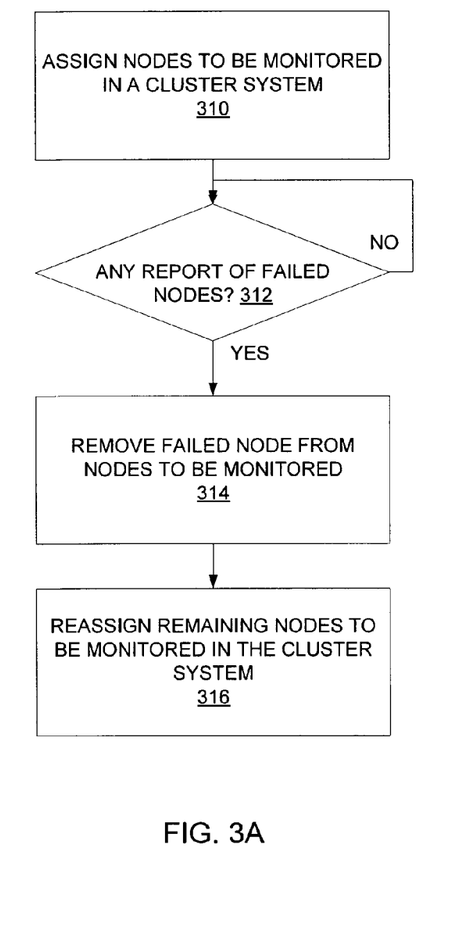
FIG. 3A illustrates a flow diagram of one embodiment of a method to perform distributed healthchecking in a cluster system.

FIG. 3A illustrates a flow diagram of one embodiment of a method to perform distributed healthchecking in a cluster system. The method may be performed by processing logic that may comprise hardware (e.g., circuitry, dedicated logic, programmable logic, microcode, etc.), software (such as instructions run on a processing device), firmware, or a combination thereof. For instance, virtual machine healthchecker 223 or the distributed healthchecking manager 260 illustrated in FIGS. 2A and 2B, respectively, may perform at least part of the method in some embodiments.

Initially, processing logic assigns nodes to be healthchecked in a cluster system to at least some of the nodes in the cluster system (processing block 310). Note that the nodes in the cluster system may be implemented on a virtual machine or on a physical computing machine. In one embodiment, processing logic simply assigns nodes that are implemented on virtual machines emulated on a physical host (e.g., a server) to the physical host. In an alternate embodiment, processing logic assigns a predetermined number of nodes to each node in the cluster system to healthcheck, regardless of whether the monitoring node is implemented on a virtual machine or a physical computing machine. Details of one embodiment of a method to perform healthchecking on a subset of nodes in a cluster system are discussed below with reference to FIG. 3B.

In some embodiments, processing logic checks to determine if any report of failed nodes has arrived (processing block 312). If not, processing logic remains in processing block 312. Otherwise, if processing logic receives a report of a failed node, then processing block removes the failed node from the nodes to be monitored (processing block 314). Next, processing logic reassigns the remaining nodes to be monitored in the cluster system to at least some of the nodes (processing block 316).

Figure 3B:
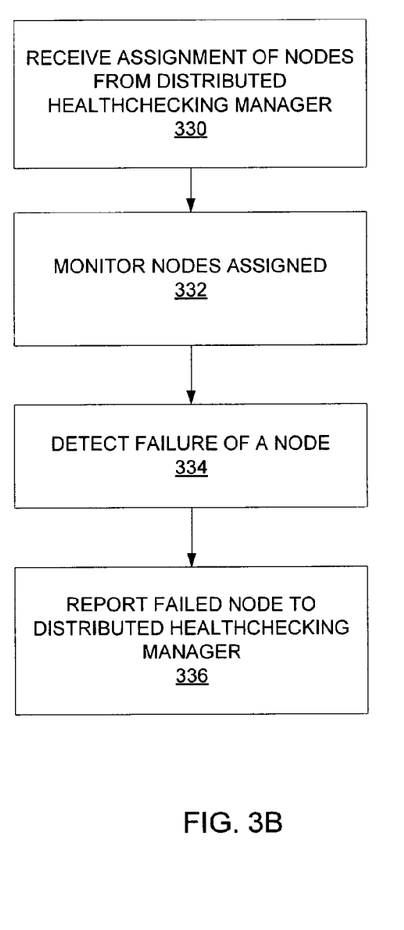
FIG. 3B illustrates a flow diagram of one embodiment of a method to healthcheck a subset of nodes in a cluster system.

FIG. 3B illustrates a flow diagram of one embodiment of a method to healthcheck a subset of nodes in a cluster system. At least part of the method may be performed by processing logic that may comprise hardware (e.g., circuitry, dedicated logic, programmable logic, microcode, etc.), software (such as instructions run on a processing device), firmware, or a combination thereof. For instance, one of the nodes 270 in FIG. 2B implemented on the computing system 400 illustrated in FIG. 4 may perform at least part of the method in some embodiments.

Initially, processing logic receives assignment of nodes from a distributed healthchecking manager (processing block 330), such as the distributed healthchecking managers 210 and 260 in FIGS. 2A and 2B, respectively. The nodes assigned include a subset of nodes in the cluster system, which may be implemented on a virtual machine or a physical computing machine. Then processing logic monitors the nodes assigned (processing block 332). In some embodiments, processing logic periodically sends a healthchecking request to the nodes assigned and waits for responses from the nodes assigned. If a node assigned fails to respond within a predetermined time period, then the node fails.

In some embodiments, processing logic detects failure of a node (processing block 334). For instance, the node has not responded to a healthchecking request within the predetermined time period, and thus, processing logic determines that the node has failed. Then processing logic reports the failed node to the distributed healthchecking manager (processing block 336). The distributed healthchecking manager may respond to the failure report as discussed above with reference to FIG. 3A.

FIG. 4 illustrates a diagrammatic representation of a machine in the exemplary form of a computing system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessing device, a central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. The processing device 402 is configured to execute the distributed healthchecking manager 426 for performing the operations and steps discussed herein.

The computing system 400 may further include a network interface device 408. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., distributed healthchecking manager 422) embodying any one or more of the methodologies or functions described herein. The distributed healthchecking manager 422 may also reside, completely or at least partially, within the main memory 404 and/or within the processing device 402 during execution thereof by the computing system 400, the main memory 404 and the processing device 402 also constituting computer-accessible storage media. The distributed healthchecking manager 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The distributed healthchecking manager 428, components and other features described herein (for example, in relation to FIGS. 2A and 2B) can be implemented as discrete hardware components or integrated into the functionalities of hardware components, such as ASICS, FPGAs, DSPs, or similar devices. In addition, the distributed healthchecking manager 428 can be implemented as firmware or functional circuitries within hardware devices. Further, the distributed healthchecking manager 428 can be implemented in any combination of hardware devices and software components.

Thus, some embodiments of a system and a method to perform distributed healthchecking in a cluster system have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   assigning, by a distributed healthchecking manager executable on a centralized server, nodes of a cluster system to a subset of the nodes of the cluster system for healthchecking;
   causing, by the distributed healthchecking manager, the subset of the nodes to perform healthchecking on the nodes assigned;
   monitoring, by the distributed healthchecking manager, the subset of the nodes for reports of one or more failed nodes;
   receiving, by the distributed healthchecking manager, a report of a failed node from a node in the subset of the nodes in the cluster system; and
   in response to the report, the distributed healthchecking manager removing the failed node and reassigning one or more remaining ones of the nodes to the subset of the nodes for healthchecking.

2. The method of claim 1, further comprising:
   taking, by the distributed healthchecking manager, corrective action in response to the report.

3. The method of claim 1, further comprising:
   sorting, by the distributed healthchecking manager, node identifiers of the nodes of the cluster system in an array, wherein the nodes of the cluster system are assigned to the subset of the nodes based on an order of the node identifiers in the array, and wherein the remaining ones of the nodes are reassigned based on positions of the remaining ones of the nodes in the array relative to positions of the subset of the nodes in the array.

4. The method of claim 1, wherein the subset of the nodes are implemented on virtual machine hosting servers.

5. The method of claim 1, wherein one or more of the subset of the nodes are implemented on virtual machine hosting servers and one or more of the subset of the nodes are implemented on virtual machines.

6. An apparatus comprising:
   a network interface to communicably couple to nodes in a cluster system; and
   a processing device executable on a centralized server in the cluster system, to assign the nodes to a subset of the nodes of the cluster system for healthchecking, to cause the subset of the nodes to perform healthchecking on the nodes assigned, and to monitor the subset of the nodes for reports of one or more failed nodes, wherein the network interface is configured to receive a report of a failed node from a node in the subset of the nodes in the cluster system, and in response to the report, the processing device is configured to remove the failed node and reassign one or more remaining ones of the nodes to the subset of the nodes for healthchecking.

7. The apparatus of claim 6, wherein the processing device is configured to take corrective action in response to the report.

8. The apparatus of claim 6, wherein the processing device is configured to sort node identifiers of the nodes of the cluster system in an array, and assign the nodes of the cluster system to the subset of the nodes based on an order of the node identifiers in the array, and wherein the processing device is configured to reassign the remaining ones of the nodes based on positions of the remaining ones of the nodes in the array relative to positions of the subset of the nodes in the array.

9. The apparatus of claim 6, wherein the subset of the nodes are implemented on virtual machine hosting servers.

10. The apparatus of claim 6, wherein one or more of the subset of the nodes are implemented on virtual machine hosting servers and one or more of the subset of the nodes are implemented on virtual machines.

11. A cluster system comprising:
    a plurality of virtual machine hosting servers to implement nodes of the cluster system; and
    a centralized server comprising:
      a network interface to communicably couple to the nodes in the cluster system, and
      a processing device to assign the nodes to a subset of the nodes of the cluster system for healthchecking, to cause the subset of the nodes to perform healthchecking on the nodes assigned, and to monitor the subset of the nodes for reports of one or more failed nodes, wherein the network interface is configured to receive a report of a failed node from a node in the subset of the nodes in the cluster system, and in response to the report, the processing device is configured to remove the failed node and reassign one or more remaining ones of the nodes to the subset of the nodes for healthchecking.

12. The cluster system of claim 11, wherein each of the plurality of virtual machine hosting servers is configured to host one or more virtual machines thereon, and each of the one or more virtual machines is configured to implement one of the nodes.

13. A non-transitory computer-readable storage medium embodying instructions that, when executed by a processing device running on a provider server, will cause the processing device to perform a method comprising:
   assigning nodes of a cluster system to a subset of the nodes of the cluster system for healthchecking;
   causing the subset of the nodes to perform healthchecking on the nodes assigned;
   monitoring the subset of the nodes for reports of one or more failed nodes;
   receiving a report of a failed node from a node in the subset of the nodes in the cluster system; and
   in response to the report, removing the failed node, and reassigning one or more remaining ones of the nodes to the subset of the nodes for healthchecking.

14. The computer-readable storage medium of claim 13, wherein the method further comprises:
   taking corrective action in response to the report.

15. The computer-readable storage medium of claim 13, wherein the method further comprises:
   sorting node identifiers of the nodes of the cluster system in an array, wherein the nodes of the cluster system are assigned to the subset of the nodes based on an order of the node identifiers in the array, and wherein the remaining ones of the nodes are reassigned based on positions of the remaining ones of the nodes in the array relative to positions of the subset of the nodes in the array.

16. The computer-readable storage medium of claim 13, wherein the subset of the nodes are implemented on virtual machine hosting servers.

17. The computer-readable storage medium of claim 13, wherein one or more of the subset of the nodes are implemented on virtual machine hosting servers and one or more of the subset of the nodes are implemented on virtual machines.

* * * * *